United States Patent [19]

Tsuda et al.

[11] 4,421,885
[45] Dec. 20, 1983

[54] HALOGEN-CONTAINING RESIN COMPOSITION CONTAINING ESTER PLASTICIZER

[75] Inventors: Katsuhiro Tsuda, Sakai; Hisao Tanaka, Sennan; Michio Nagae, Izumiohtsu; Yasuhiko Imanaga, Kaizuka, all of Japan

[73] Assignee: Dainippon Ink and Chemicals, Inc., Tokyo, Japan

[21] Appl. No.: 303,123

[22] Filed: Sep. 17, 1981

Related U.S. Application Data

[62] Division of Ser. No. 175,764, Aug. 6, 1980, Pat. No. 4,317,760.

[30] Foreign Application Priority Data

Jul. 31, 1979 [JP] Japan ................................. 54-97560

[51] Int. Cl.³ ..................... C08K 5/10; C08K 5/11; C08K 5/15
[52] U.S. Cl. ..................... 524/295; 524/111; 524/285; 524/287; 524/294; 524/296; 524/297; 524/298; 524/299; 524/311; 524/314; 524/569
[58] Field of Search .......... 524/287, 314, 111, 296, 524/285, 311, 294, 569, 297, 298, 295, 299

[56] References Cited

U.S. PATENT DOCUMENTS

| | | | |
|---|---|---|---|
| 2,072,739 | 3/1937 | Dykstra | 525/327 |
| 2,120,756 | 6/1938 | Kyrides | 524/298 |
| 2,260,295 | 10/1941 | Carruthers et al. | 524/292 |
| 2,608,577 | 8/1952 | Weener | 524/569 |
| 2,997,484 | 8/1961 | Beavers et al. | 260/318.5 |
| 3,155,714 | 11/1964 | Mills | 524/296 |
| 3,175,989 | 3/1965 | Cannon et al. | 524/296 |
| 3,336,363 | 8/1967 | Dill | 524/296 |
| 3,538,145 | 11/1970 | Hirzy | 524/296 |
| 3,736,348 | 5/1973 | Gough et al. | 260/31.8 R |
| 3,803,072 | 4/1974 | Graham et al. | 428/516 |
| 3,872,154 | 3/1975 | Hirzy | 260/31.8 B |
| 3,876,671 | 4/1975 | Turner | 260/31.8 B |
| 3,888,909 | 6/1975 | Hendrickriem et al. | 260/31.8 B |
| 3,956,220 | 5/1976 | Riem et al. | 260/31.8 B |
| 4,130,532 | 12/1978 | Lamb | 524/111 |
| 4,132,696 | 1/1979 | Lamb | 524/111 |
| 4,132,703 | 1/1979 | Crochemore et al. | 524/111 |
| 4,231,915 | 11/1980 | Kaufhold et al. | 260/31.8 R |
| 4,298,517 | 11/1981 | Sandler | 524/296 |

FOREIGN PATENT DOCUMENTS

| | | |
|---|---|---|
| 931781 | 7/1963 | United Kingdom |
| 1105620 | 3/1968 | United Kingdom |
| 1137882 | 12/1968 | United Kingdom |
| 1455196 | 11/1976 | United Kingdom |

OTHER PUBLICATIONS

Derwent Abstract 30637B/16, (J54032-559), Miyoshi Hushi, "Vinyl Chloride Resin Comp. . . . ".
SPE Journal, "Vinyl Plasticizers From Trimellitic Anhydride", Nov. 1962.

*Primary Examiner*—Melvyn I. Marquis
*Assistant Examiner*—Herbert J. Lilling
*Attorney, Agent, or Firm*—Sherman & Shalloway

[57] ABSTRACT

A plasticizer for halogen-containing resins which is composed of at least one compound expressed by the general formula

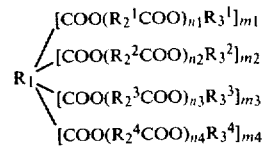

wherein $R_1$ represents an aromatic hydrocarbon group containing 1 or 2 aromatic rings or an alicyclic hydrocarbon group having 4 to 37 carbon atoms, $R_2^1$, $R_2^2$, $R_2^3$ and $R_2^4$ are identical or different and each represents an aliphatic hydrocarbon group having 2 to 17 carbon atoms, $R_3^1$, $R_3^2$, $R_3^3$ and $R_3^4$ are identical or different and each represents an aliphatic hydrocarbon group having 2 to 22 carbon atoms, an aromatic hydrocarbon group or a heterocyclic group, each of $n_1$, $n_2$, $n_3$ and $n_4$ is 0 or an integer of 1 to 20 and the sum of these is 1 to 20, and each of $m_1$, $m_2$, $m_3$ and $m_4$ is 0 or 1 and the sum of these is 1 to 4. The plastizer has superior thermal stability, processability and compatibility. Halogen-containing resins plasticized with this plasticizer have especially high utility in applications requiring thermal stability.

16 Claims, No Drawings

HALOGEN-CONTAINING RESIN COMPOSITION CONTAINING ESTER PLASTICIZER

This is a division, of application Ser. No. 175,764, filed Aug. 6, 1980, now U.S. Pat. No. 4,317,760 issued on Mar. 3, 1982.

This invention relates to a plasticizer for halogen-containing resins which has superior thermal stability, processability and compatibility, and to a resin composition comprising a halogen-containing resin and the plasticizer.

Plasticized vinyl chloride resin products have found extensive applications. In recent years, these resin products have been required to have higher heat-aging resistance as more rigorous safety regulations have been set down on coated cables and automotive parts.

The heat-aging resistance of plasticized vinyl chloride resins is affected by the types and amounts of stabilizers and plasticizers and if present, fillers. Essentially, the effect of plasticizers is the greatest. The heat-aging resistance of a plasticizer has to do with its volatility and heat decomposability, and generally, plasticizers having higher molecular weights have better heat-aging resistance because they have lower vapor pressures.

Known plasticizers having better heat-aging reistance than di-2-ethylhexyl phthalate (DOP), a typical conventional plasticizer, include dialkyl esters of phthalic acid with monohydric alcohols having 9 to 13 carbon atoms such as dinonyl phthalate, diisodecyl phthalate and ditridecyl phthalate, and alkyl esters of aromatic tri- or tetra-carboxylic acids with monohydric alcohols having 6 to 10 carbon atoms such as trihexyl trimellitate, tri-2-ethylhexyl trimellitate (TOTM), triisodecyl trimellitate, and tetra-2-ethylhexyl pyromellitate.

Since, however, these plasticizers have a low ratio of polar groups in the molecules because of the large number of carbon atoms of the alcohol, they have poor compatibility with vinyl chloride resins and poor processability (e.g., insufficient gelling property), or have the defect of bleeding on the surface of the resin.

Other known plasticizers include polyesters having a molecular weight of 600 to 1000 composed of repetition of units of a dibasic carboxylic acid such as adipic acid and units of a glycol such as propylene glycol or 1,3-butanediol, or a modification product thereof resulting from modification of its ends with a fatty acid or an alcohol. These plasticizers have better heat-aging resistance when they have higher molecular weights, but on the other hand, have poor processability. In addition, when these polyesters are used in combination with lead-type stabilizers added mainly to cable-coating vinyl chloride resins, they cannot give sufficient electric insulation to the resins and moreover have very poor bleeding resistance at high humidity.

It is an object of this invention therefore to provide a halogen-containing resin composition having especially high heat-aging resistance by discovering a plasticizer for halogen-containing resins which has superior compatibility, processability and bleeding resistance as well as excellent heat-aging resistance.

It has now been found that the above object of this invention can be achieved by using as a plasticizer at least one compound of the general formula

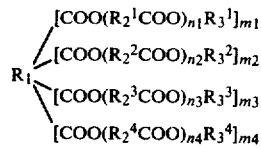

wherein $R_1$ represents an aromatic hydrocarbon group containing 1 or 2 aromatic rings or an alicyclic hydrocarbon group having 4 to 37 carbon atoms, $R_2^1$, $R_2^2$, $R_2^3$ and $R_2^4$ are identical or different and each represents an aliphatic hydrocarbon group having 2 to 17 carbon atoms, $R_3^1$, $R_3^2$, $R_3^3$ and $R_3^4$ are identical or different and each represents an aliphatic hdydrocarbon group having 2 to 22 carbon atoms, an aromatic hydrocarbon group or a heterocyclic group, each of $n_1$, $n_2$, $n_3$ and $n_4$ is 0 or an integer of 1 to 20 and the sum of these is 1 to 20, and each of $m_1$, $m_2$, $m_3$ and $m_4$ is 0 or 1 and the sum of these is 1 to 4.

Thus, according to this invention, there is provided a halogen-containing resin composition comprising (1) a halogen-containing resin and (2) a plasticizer composed of at least one compound of the above general formula.

In the above general formula, $R_1$ is an aromatic carboxylic acid residue having 1 to 4 carboxyl groups and 1 or 2 aromatic rings or an alicyclic carboxylic acid residue having 1 to 4 carboxyl groups and 4 to 37 carbon atoms. Examples of the aromatic carboxylic acid are monocarboxylic acids such as benzoic acid and toluic acid, dicarboxylic acids such as phthalic acid, isophthalic acid, terephthalic acid, methylphthalic acid, naphthalenedicarboxylic acid, tetrachlorophthalic acid and tetrabromophthalic acid, tricarboxylic acids such as trimellitic acid and trimesic acid, tetracarboxylic acids such as pyromellitic acid and benzophenonetetracarboxylic acid, and the anhydrides and esters of these mono- to tetra-carboxylic acids. Examples of the alicyclic carboxylic acid include monocarboxylic acids such as cyclohexenecarboxylic acid and methylcyclohexenecarboxylic acid, dicarboxylic acids such as Nadic acid, Het acid, tetrahydrophthalic acid, hexahydrophthalic acid, 3-methyltetrahydrophthalic acid and 3-methylhexahydrophthalic acid, tricarboxylic acids such as 1,3-dimethyl-1,2,3-cyclohexanetricarboxylic acid and 1-carboxy-4-methylcyclohexyl-succinic acid, tetracarboxylic acids such as methylcyclohexenetetracarboxylic acid, and the anhydrides and esters of these mono- to tetra-carboxylic acids. In view of economy and the availability of raw materials, phthalic anhydride, isophthalic acid, terephthalic acid and trimellitic anhydride are preferred.

In the general formula, $R_2^1$, $R_2^2$, $R_2^3$ and $R_2^4$ are preferably a divalent aliphatic hydrocarbon group corresponding to X in a lactone of the general formula

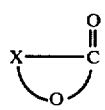

wherein X represents an aliphatic hydrocarbon group having 2 to 17 carbon atoms, or a hydroxycarboxylic acid of the general formula

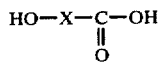

wherein X is as defined above. They may be identical or different. Examples of the aforesaid lactone are beta-propiolactone, gamma-butyrolactone, delta-valerolactone, epsilon-caprolactone, methyl-epsilon-caprolactone, dimethyl-epsilon-caprolactone, and trimethyl-epsilon-caprolactone. Lactic acid and ricinoleic acid are cited as examples of the hydroxycarboxylic acid. Of these, epsilon-caprolactone and methyl-epsilon-caprolactone are preferred in view of economy and the ease of the reaction operation.

As a component of $(R_2^1COO)_{n1}$, $(R_2^2COO)_{n2}$, $(R_2^3COO)_{n3}$, and $(R_2^4COO)_{n4}$ in the above general formula, a polymer of the aforesaid lactone or hydroxycarboxylic acid may be used. This polymer is usually expressed by the general formula

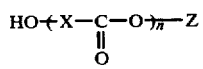

wherein Z is H or an alkyl group, n is an integer of 2 to 30, and X is as defined above. This polymer becomes the constituent component as a result of molecular cleavage during synthesis of the plasticizer to reduce the number of repeating units to 20 or less. In the case of the lactone polymer, water or a monohydric alcohol having 1 to 22 carbon atoms in the alkyl group is used as an initiator. A specific example is a ring-opened polymer of a lactone such as epsilon-caprolactone or methyl-epsilon-caprolactone obtained with water or a monohydric alcohol.

$R_3^1$, $R_3^2$, $R_3^3$ and $R_3^4$ preferably correspond to Y in a monohydric alcohol of the general formula Y—OH in which Y represents a hydrocarbon group having 2 to 22 carbon atoms, preferably 6 to 18 carbon atoms. They may be identical or different. Examples of the monohydric alcohol include aliphatic monohydric alcohols such as butanol, hexanol, isohexanol, heptanol, isoheptanol, octanol, iso-octanol, 2-ethylhexanol, decanol, isodecanol, undecanol, iso-undecanol, lauryl alcohol, tridecanol, isotridecanol, tetradecanol, pentadecanol and hexadecanol, aromatic monohydric alcohols such as benzyl alcohol, and heterocyclic monohydric alcohols such as tetrahydrofurfuryl alcohol.

The plasticizer of this invention can be prepared by reacting compounds constituting the aforesaid $R_1$, $R_2$ and $R_3$ components in the absence or presence of a solvent capable of forming an azeotrope with water, such as toluene or xylene, at a temperature sufficient to distill out water. Alternatively, it may be prepared by reacting any two compounds for forming the $R_1$, $R_2$ and $R_3$ compounds and then reacting the remaining compound with the reaction product to perform esterification or ester-interchange reaction.

In the general formula, each of $n_1$, $n_2$, $n_3$ and $n_4$ is 0 or an integer of 1 to 20, preferably 1 to 10, and the sum of these is 1 to 20, preferably 1 to 10. If the sum of them exceeds 20, the resulting plasticizer has deteriorated electric insulation, processability and bleed resistance although its migration resistance and oil resistance are improved as the molecular weight increases. Accordingly, it is preferred to use not more than 20 moles of a compound for forming the $R_2$ component per mole of a compound for forming the $R_1$ component. When the lactone polymer is used as a compound for forming the $R_2$ compound, the average molecular weight of the polymer must be taken as 1 mole in calculation. In order to promote the reaction, it is desirable to use the compound for forming the $R_3$ compound in an amount of at least 1 equivalent per carboxyl group equivalent of the compound for forming the $R_1$ component.

In the synthesis of the plasticizer of this invention, it is preferred to use an esterification or ester-interchange reaction catalyst, for example an acid catalyst such as sulfuric acid, p-toluenesulfonic acid or phosphoric acid or a metal compound catalyst such as zinc chloride, zinc acetate, lead oxide, tetraisopropyl titanate or dibutyltin oxide because such a catalyst serves to accelerate the reaction. In order to render the final product light in color, it is suitable to introduce an inert gaseous stream such as nitrogen gas.

Halogen-containing resins into which the plasticizer of this invention is incorporated include polyvinyl chloride, polyvinylidene chloride, chlorinated polyolefins, a vinyl chloride/vinyl acetate copolymer, and a vinyl chloride/vinylidene chloride copolymer. Chlorine-containing resins are especially suitable.

The amount of the plasticizer in the halogen-containing resin composition in this invention is usually about 5 to about 200 parts by weight, preferably 20 to 100 parts by weight, per 100 parts by weight of the halogen-containing resin. If desired, the plasticizer of this invention may be used in combination with known plasticizers used in the field of processing polyvinyl chloride resins, for example phthalates such as DOP, adipates such as di-2-ethylhexyl adipate, trimellitates such as TOTM, epoxidized fatty acid esters, chlorinated fatty acid esters, chlorinated paraffins, phosphates, and polyesters derived from adipic acid. The plasticizer of this invention may also be used together with other additives such as stabilizers, fillers and pigments.

The halogen-containing resin composition in accordance with this invention is used in various applications. Specific applications include automotive applications as interior devices such as leathers, dashboards and steering wheels, exterior devices such as side bumper, and window packings; electrical applications as cable sheaths, insulation tapes and tubes; and household good applications as hoses of electric washers, shower curtains, hoses of dryers, gaskets in refrigerators. It is especially suitably used in applications which require heat-aging resistance.

The following Synthesis Examples and Example illustrate the present invention in greater details. It should be noted that the invention is in no way limited by these examples. All parts in these examples are by weight.

Synthesis Example 1

A reactor equipped with a reflux condenser was charged with 296 parts (2 moles) of phthalic anhydride, 456 parts (4 moles) of epsilon-caprolactone, 572 parts (4.4 moles) of 2-ethylhexanol, 124 parts of toluene and 6.2 parts of p-toluenesulfonic acid as a catalyst. In a stream of nitrogen gas, they were heated with stirring, and toluene was refluxed at a maximum temperature of 140° C. While removing the resulting water continuously by a water separator, the reaction was carried out for 7 hours until the acid value of the reaction mixture reached 3 or below. The crude ester was neutralized with sodium carbonate, washed with water, and steamdistilled at 120° to 130° C. to remove toluene and the excess (about 0.4 mole) of 2-ethylhexanol. The residue was dehydrated under reduced pressure, and cooled to 100° C. Activated carbon (6 parts) was added, and the mixture was stirred for 1 hour and then filtered. There was obtained a plasticizer having a viscosity (measured at 25° C.) by the Gardner-Holdt method) of G, a color (determined by the Gardner-Hellige method) of less than 1, an acid value of 0.17, an ester value of 359 and a volume inherent resistivity (30° C.) of $7.3 \times 10^{11}$ ohms-cm.

The molecular weight distribution of the resulting plasticizer was measured by gel-permeation chromatography by comparison with a compound of a known molecular weight such as DOP. It was found consequently that this plasticizer contained about 81% of a mixture of compounds of the following structural formula (the main component of which consisted of compounds of the formula in which the sum of $n_1$ and $n_2$ is nearly equal to 2) and about 19% of DOP.

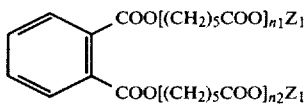

(wherein $Z_1$ is a residue of 2-ethylhexanol; $n_1 + n_2 = 1-20$; $n_1$ and $n_2 = 0$ or 1–20)

Synthesis Example 2

A reactor equipped with a reflux condenser was charged with 296 parts (2 moles) of phthalic anhydride, 912 parts (8 moles) of epsilon-caprolactone, 676 parts (5.2 moles) of 2-ethylhexanol and 8.5 parts of p-toluenesulfonic acid as a catalyst. In a stream of nitrogen gas, they were heated with stirring, and while continuously removing the resulting water, the reaction was performed at 140° C. for 6 hours until the acid value of the reaction mixture reached 3 or less. The crude ester was neutralized with sodium carbonate, washed with water, and dehydrated at 100° C. under reduced pressure. Then, the excess (about 1.2 moles) of 2-ethylhexanol was removed at a maximum temperature of 180° C. under a pressure of 2 torr. The residue was cooled to 100° C., and 8.5 parts of activated carbon was added. The mixture was stirred for 1 hour, and then filtered to afford a platicizer having a viscosity of M-N, a color of less than 1, an acid value of 0.26, an ester value of 396 and a volume inherent resistivity of $6.3 \times 10^{11}$ ohms-cm.

The molecular weight distribution of the plasticizer was measured in the same way as in Synthesis Example 1. It was found that the resulting plasticizer contained about 89% of a mixture of compounds of the same structural formula as given in Example 1 (the main component of which consisted of compounds of the formula in which $n_1 + n_2$ is nearly equal to 4), about 9% of DOP and about 2% of compounds of the same structural formula as in Example 1 in which $n_1$ plus $n_2$ exceeds 20.

Synthesis Example 3

A reactor was charged with 456 parts (4 moles) of epsilon-caprolactone, 288 parts (2 moles) of a $C_9$ monoalcohol mixture (Diadol 9, a tradename for a product of Mitsubishi Chemical Co., Ltd.; composed of 50% of linear $C_9$ alcohol and 50% of branched $C_9$ alcohol) and 0.39 part of dibutyltin oxide as a catalyst. In a stream of nitrogen gas, they were heated with stirring, and maintained at 200° C. for 3 hours to afford an addition product of 2 moles on an average of the lactone with 1 mole of "Diadol 9." Then, 296 parts (2 moles) of phthalic anhydride was added, and the mixture was maintained at 200° C. for 3 hours to obtain a half phthalate of the aforesaid adduct. Then, 461 parts (3.2 moles) of "Diadol 9" was added. A reflux condenser was attached to the reactor, and while continuously removing the resulting water by a water separator, the mixture was heated for 4 hours at a maximum temperature of 220° C. until the acid value of the reaction mixture reached 2 or less. The excess (about 172.8 parts; about 1.2 moles) of "Diadol 9" was removed at a temperature of 190° C. and a pressure of 2 torr. The residue was cooled, and filtered to afford a plasticizer having a viscosity of D-E, a color of 1–2, an acid value of 0.18, an ester value of 341 and a volume inherent resistivity of $4.0 \times 10^{11}$ ohms-cm.

The molecular weight distribution of the resulting plasticizer was measured in the same way as in Synthesis Example 1. It was found that this plasticizer contained about 77% of a mixture of compounds of the following structural formula (the main component of which consisted of compounds of the formula in which $n_1 + n_2 = 2$), about 22% of the phthalate of "Diadol 9", and about 1% of compounds of the following structural formula in which the sum of $n_1$ and $n_2$ exceeds 20.

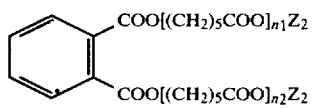

(wherein $Z_2$ is a residue of $C_9$ monoalcohols; $n_1 + n_2$ is 1–20, and $n_1$ and $n_2$ are 0 or 1–20)

Synthesis Example 4

A reactor was charged with 456 parts (4 moles) of epsilon-caprolactone, 681 parts (5.2 moles) of a mixture of $C_7$, $C_9$ and $C_{11}$ monoalcohols (Diadol 711L, a tradename for a product of Mitsubishi Chemical Co., Ltd.; average carbon number 8.1; containing 50% of linear alcohols and 50% branched alcohols) and 0.37 part of tetraisopropyl titanate as a catalyst. In a stream of nitrogen gas, they were heated with stirring, and maintained at 200° C. for 3 hours to form a mixture of a lactone adduct of "Diadol 711L" and unreacted "Diadol 711L". Then, 332 parts (2 moles) of isophthalic acid was added. A reflux condenser was attached to the reactor, and while continuously removing the resulting water by a water separator, the heating was continued at a maximum temperature of 220° C. until the acid value of the reaction mixture reached 2 or less. The excess (150 parts) of the "Diadol 711L" was removed at 190° C. and 2 torr. The residue was cooled to 100° C., and 6.2 g of hydroxide aluminum magnesium co-dried gel was added. The mixture was stirred for 1 hour, and then filtered to afford a plasticizer having a viscosity of E-F, a color of 1–2, an acid value of 0.11, an ester value of 358 and a volume inherent resistivity of $6.8 \times 10^{11}$ ohms-cm.

The molecular weight distribution of the resulting plasticizer was measured in the same way as in Synthesis Example 1. It was found that this plasticizer contained about 80% of a mixture of compounds of the following structural formula (the main component of which consisted of the formula in which $n_1 + n_2$ is nearly equal to 2) and about 20% of the isophthalate of "Diadol 711L".

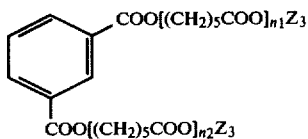

(wherein $Z_3$ represents residues of $C_7$, $C_9$ and $C_{11}$ monoalcohols; the sum of $n_1$ and $n_2$ is 1 to 20; $n_1$ and $n_2$ represent 0 or 1 to 20)

Synthesis Example 5

A reactor was charged with 948 parts (2 moles) of diundecyl phthalate derived from phthalic anhydride and a $C_{11}$ monoalcohol mixture (Diadol 11, a tradename for a product of Mitsubishi Chemical Co., Ltd.; composed of 50% of linear $C_{11}$ alcohol and 50% of branched $C_{11}$ alcohol), 508 parts (4 moles as lactone units) of poly(epsilon-caprolactone) having an average molecular weight of 1000 and prepared by using n-hexanol as an initiator, and 0.4 part of dibutyltin oxide as a catalyst. In a stream of nitrogen gas, they were heated with stirring, and maintained at 210° C. for 20 hours to perform the reaction until the ester-interchange reaction reached equilibrium. Then, the reaction mixture was treated at the same temperature under a pressure of 2 torr to remove 50 g of a fraction composed mainly of n-hexanol. The residue was cooled to 100° C., and filtered to afford a plasticizer having a viscosity of F, a color of 3, an acid value of 0.20, an ester value of 311, a hydroxyl value of 1.2 and a volume inherent viscosity of $3.7 \times 10^{11}$ ohms-cm.

The molecular weight distribution of the resulting plasticizer was measured in the same way as in Synthesis Example 1. It was found that this plasticizer contained about 76% of a mixture of compounds of the following structural formula (the main component of which consisted of compounds of the formula in which the sum of $n_1$ and $n_2$ is nearly equal to 2), about 22% by weight of the unreacted diundecyl phthalate and about 2% by weight of compounds of the following formula in which the sum of $n_1$ and $n_2$ exceeds 20.

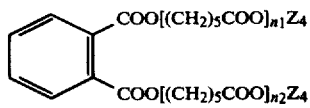

(wherein $Z_4$ represents a residue of $C_{11}$ monoalcohol; the sum of $n_1$ and $n_2$ is 1 to 20; $n_1$ and $n_2$ are 0 or 1 to 20)

Synthesis Example 6

A reactor equipped with a reflux condenser was charged with 192 parts (1 mole) of trimellitic anhydride, 114 parts (1 mole) of epsilon-caprolactone, 507 parts (3.9 moles) of 2-ethylhexanol and 0.2 part of tetraisopropyl titanate as a catalyst. In a stream of nitrogen gas, they were heated with stirring, and while continuously removing the resulting water by a water separator, the heating was continued for 6 hours at a maximum temperature of 220° C. until the acid value of the reaction mixture reached 2 or less. The excess (about 0.9 mole) of 2-ethyl hexanol was removed at 180° C. and 2 torr. The residue was cooled to 100° C., and then filtered to afford a platicizer having a viscosity of H-I², a color of 3-4, an acid value of 0.13, an ester value of 339 and a volume inherent resistivity of $8.8 \times 10^{11}$ ohms-cm.

The molecular weight distribution of the resulting plasticizer was measured in the same way as in Synthesis Example 1. It was found that this plasticizer contained about 65% of a mixture of compounds of the following structural formula (the main component of which consisted of compounds of the formula in which the sum of $n_1$, $n_2$, and $n_3$ is nearly equal to 1) and about 35% of TOTM.

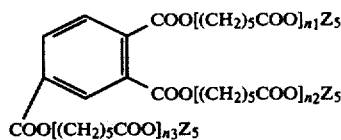

(wherein $Z_5$ is a residue of 2-ethylhexanol; the sum of $n_1$, $n_2$ and $n_3$ is 1 to 20; $n_1$, $n_2$ and $n_3$ are 0 or 1 to 20)

Synthesis Example 7

A reactor equipped with a reflux condenser was charged with 192 parts (1 mole) of trimellitic anhydride, 342 parts (3 moles) of epsilon-caprolactone, 429 parts (3.3 moles) of 2-ethylhexanol and 4.4 parts of p-toluenesulfonic acid as a catalyst. In a stream of nitrogen gas, the heating was carried out. The mixture was maintained at a maximum temperature of 140° C., and while continuously removing the resulting water by a water separator, the reaction was carried out for 11 hours until the acid value of the reaction mixture reached 3 or less. The reaction mixture was worked up in the same way as in Synthesis Example 1 to afford a plasticizer having a viscosity of N-O, a color of 1, an acid value of 0.24, an ester value of 378 and a volume inherent resistivity of $1.2 \times 10^{12}$ ohms-cm.

The molecular weight distribution of the resulting plasticizer was measured in the same way as in Synthesis Example 1. It was found that this plasticizer contained 96% of a mixture of compounds of the same structural formula as given in Synthesis Example 6 (the main component of which consisted of compounds of the formula in which the sum of $n_1$, $n_2$ and $n_3$ is nearly equal to 3) and about 4% of compounds of the structural formula of Synthesis Example 6 in which the sum of $n_1$, $n_2$ and $n_3$ exceeds 20.

Synthesis Example 8

A reactor equipped with a reflux condenser was charged with 192 parts (1 mole) of trimellitic anhydride, 684 parts (6 moles) of epsilon-caprolactone, 429 parts (3.3 moles) of 2-ethylhexanol, 123 parts of toluene and 6.1 parts of p-toluenesulfonic acid as a catalyst. In a stream of nitrogen gas, the heating was carried out with stirring. Toluene was refluxed at a maximum temperature of 140° C. While continuously removing the resulting water by a water separator, the reaction was carried out for 6 hours until the acid value of the reaction mixture reached 3 or less. The reaction mixture was then worked up in the same way as in Synthesis Example 1 to afford a plasticizer having a viscosity of T-U², a color of less than 1, an acid value of 0.20, an ester value of 407 and a volume inherent resistivity of $1.9 \times 10^{12}$ ohms-cm.

The molecular weight distribution of the resulting plasticizer was measured in the same way as in Synthesis Example 1. It was found that this plasticizer contained about 94% by weight of a mixture of compounds of the same structural formula as given in Synthesis Example 6 (the main component of which consisted of compounds of the formula in which the sum of $n_1$, $n_2$ and $n_3$ is nearly equal to 6) and about 6% of compounds of the same structural formula in which the sum of $n_1$, $n_2$ and $n_3$ exceeds 20.

Synthesis Example 9

A reactor equipped with a reflux condenser was charged with 192 parts (1 mole) of trimellitic anhydride, 1026 parts (9 moles) of epsilon-caprolactone, 429 parts (3.3 moles) of 2-ethylhexanol, 157 parts of toluene and 7.9 parts of p-toluenesulfonic acid as a catalyst. In a stream of nitrogen gas, they were heated with stirring, and at a maximum temperature of 140° C., toluene was refluxed. While continuously removing the resulting water by a water separator, the reaction was carried out for 7 hours until the acid value of the reaction mixture reached 3 or less. The reaction mixture was then worked up in the same way as in Synthesis Example 1 to afford a plasticizer having a viscosity of V-W$^3$ (a white solid at 20° C. or below), a color of 1–2, an acid value of 0.25, an ester value of 429, and a volume inherent resistivity of $2.0 \times 10^{12}$ ohms-cm.

The molecular weight distribution of the resulting plasticizer was measured in the same way as in Synthesis Example 1. It was found that this plasticizer contained about 90% of a mixture of compounds of the same structural formula as given in Synthesis Example 6 (the main component of which consisted of compounds of the formula in which the sum of $n_1$, $n_2$ and $n_3$ is nearly equal to 9) and about 10% of compounds of the same structural formula in which the sum of $n_1$, $n_2$ and $n_3$ exceeds 20.

Synthesis Example 10

A reactor equipped with a reflux condenser was charged with 192 parts (1 mole) of trimellitic anhydride, 342 parts (3 moles) of epsilon-caprolactone, 475 parts (3.3 moles) of "Diadol 9", 93 parts of toluene and 4.7 parts of p-toluenesulfonic acid. In a stream of nitrogen gas, they were heated with stirring. While maintaining the mixture at a maximum temperature of 140° C., it was reacted for 6 hours until the acid value of the reaction mixture reached 3 or less. The reaction mixture was then worked up in the same way as in Synthesis Example 1 to afford a plasticizer having a viscosity of K$^2$-L, a color of less than 1, an acid value of 0.26, an ester value of 358 and a volume inherent resistivity of $9.0 \times 10^{11}$ ohms-cm.

The molecular weight distribution of the resulting plasticizer was measured in the same way as in Synthesis Example 1. It was found that this plasticizer contained about 95% of a mixture of compounds of the following structural formula (the main component of which consisted of compounds of the formula in which the sum of $n_1$, $n_2$ and $n_3$ is nearly equal to 3) and about 5% of compounds of the following structural formula in which the sum of $n_1$, $n_2$ and $n_3$ exceeds 20.

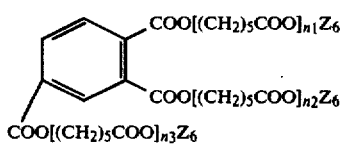

(wherein $Z_6$ is a residue of $C_9$ monoalcohol; the sum of $n_1$, $n_2$ and $n_3$ is 1 to 20; $n_1$, $n_2$ and $n_3$ are 0 or 1 to 20)

Synthesis Example 11

A reactor equipped with a reflux condenser was charged with 192 parts (1 mole) of trimellitic anhydride, 342 parts (3 moles) of epsilon-caprolactone, 568 parts (3.3 moles) of "Diadol 11", 101 parts of toluene and 5.1 parts of p-toluenesulfonic acid as a catalyst. In a stream of nitrogen-gas, they were heated with stirring, and at a maximum temperature of 140° C., toluene was refluxed. While continuously removing the resulting water by a water separator, the reaction was carried out for 7 hours until the acid value of the reaction mixture reached 3 or less. The reaction mixture was worked up in the same way as in Synthesis Example 1 to afford a plasticizer having a viscosity of K-L, a color of less than 1, an acid value of 0.19, an ester value of 329 and a volume inherent resistivity of $1.1 \times 10^{12}$ ohms-cm.

The molecular weight distribution of the resulting plasticizer was measured in the same way as in Synthesis Example 1. It was found that this plasticizer contained about 96% of a mixture of compounds of the following structural formula (the main component of which consisted of compounds of the formula in which the sum of $n_1$, $n_2$ and $n_3$ is nearly equal to 3) and about 4% of compounds of the following formula in which the sum of $n_1$, $n_2$ and $n_3$ exceeds 20.

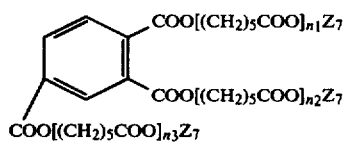

(wherein $Z_7$ represents a residue of $C_{11}$ monoalcohol; the sum of $n_1$, $n_2$ and $n_3$ is 1 to 20; $n_1$, $n_2$ and $n_3$ are 0 or 1 to 20)

Example

A sheet was prepared in accordance with the following basic compounding recipe and molding conditions using each of the plasticizers obtained in Synthesis Examples 1 to 11 and DOP as a prior art plasticizer (containing dissolved therein 0.5% of bisphenol A as an antioxidant).

| Basic compounding recipe | |
| --- | --- |
| Polyvinyl chloride (DP = 1450) | 100 parts |
| Plasticizer | 50 parts |
| Tribasic lead sulfate | 5 parts |
| Lead stearate | 1 part |
| Molding conditions | |
| Roll (6 inches in diameter): 165° C. × 10 minutes | |
| Press (1 mm thick): 170° C. × 5 minutes | |

The resulting sheets were tested for the following properties, and the results are tabulated below.

(1) Hardness (JIS spring A scale)

Measured substantially in accordance with JIS-K6301.

(2) Tensile Test

Measured substantially in accordance with JIS-K6723.

(3) Heat Aging Test

Performed substantially in accordance with JIS-K6723. The test was conducted at 136° C. for 168 hours, and at 158° C. for 168 hours, respectively. The results are shown by percent weight loss (%) and percent residual elongation (%) after the test. The sign " — " in the column of the percent residual elongation shows that the measurement was impossible because the specimen was hardened.

(4) Test for bleeding at high humidity

A roll sheet having a thickness of 0.3 mm was prepared from the above basic compound, and a test specimen, 40 mm×100 mm in size, was cut off. The test specimen was allowed to stand in a vessel kept at 70° C. and a relative humidity of 98%. The degree of bleeding of the test specimen was determined 5 days later. The circle mark in the following table shows that no bleeding phenomenon was noted.

(5) Low temperature flexibility test

Measured substantially in accordance with ASTM D-1043-51.

(6) Brabender gelling speed

Fifty grams of the above basic compound was taken, and pre-dried at 50° C. for 1 hour. The dried sample was filled in a Brabender plasticorder. Its rotation at 60 r.p.m. was started at a jacket temperature of 165° C., and the time (seconds) which elapsed until a maximum torque was reached was determined.

carbon group having 4 to 37 carbon atoms, $R_2^1$, $R_2^2$, $R_2^3$ and $R_2^4$ are identical or different and each represents an aliphatic hydrocarbon group having 2 to 17 carbon atoms, $R_3^1$, $R_3^2$, $R_3^3$ and $R_3^4$ are identical or different and each represents an aliphatic hydrocarbon group having 5 to 22 carbon atoms, an aromatic hydrocarbon group or a heterocyclic group, each of $n_1$, $n_2$, $n_3$ and $n_4$ is 0 or an integer of 1 to 20 and the sum of these is 1 to 20, and each of $m_1$, $m_2$, $m_3$ and $m_4$ is 0 or 1 and the sum of these is 1 or 2.

2. The composition of claim 1 wherein said halogen-containing resin is a chlorine-containing resin.

3. The composition of claim 1 wherein said plasticizer is prepared by reacting (i) an aromatic dicarboxylic acid containing 1 or 2 aromatic rings or an alicyclic dicarboxylic acid having 4 to 37 carbon atoms, (ii) a lactone of the general formula

wherein X represents an aliphatic hydrocarbon group having 5 to 17 carbon atoms, a hydroxycarboxylic acid

| Plasticizer | Hardness (JIS spring A scale) | Tensile test | | | Heat aging test | | | | Test for bleeding at high humidity (5 days later) | Low temperature flexibility (°C.) | Brabender gelling speed (seconds) |
| | | | | | 136° × 168 hours | | 158° C. × 168 hours | | | | |
| | | 100% Modulus (kg/cm²) | Tensile strength (kg/cm²) | Elongation (%) | Percent weight loss (%) | Percent residual elongation (%) | Percent weight loss (%) | Percent residual elongation (%) | | | |
| Synthesis Example 1 | 91 | 116 | 252 | 339 | 7.0 | 84 | 14.8 | 58 | | −18 | 45 |
| Synthesis Example 2 | 92 | 116 | 258 | 343 | 3.2 | 91 | 12.4 | 55 | | −15 | 40 |
| Synthesis Example 3 | 92 | 115 | 248 | 354 | 6.0 | 85 | 13.0 | 52 | | −19 | 45 |
| Synthesis Example 4 | 93 | 120 | 256 | 350 | 6.1 | 84 | 13.1 | 54 | | −21 | 45 |
| Synthesis Example 5 | 94 | 122 | 250 | 368 | 3.8 | 91 | 10.9 | 52 | | −23 | 45 |
| Synthesis Example 6 | 96 | 135 | 258 | 344 | 1.0 | 97 | 9.6 | 58 | | −14 | 40 |
| Synthesis Example 7 | 96 | 134 | 247 | 348 | 0.6 | 98 | 8.7 | 59 | | −14 | 35 |
| Synthesis Example 8 | 96 | 130 | 257 | 338 | 0.8 | 98 | 10.1 | 58 | | −10 | 35 |
| Synthesis Example 9 | 96 | 138 | 263 | 322 | 0.6 | 97 | 11.8 | 53 | | −10 | 35 |
| Synthesis Example 10 | 96 | 146 | 263 | 359 | 0.5 | 98 | 7.7 | 57 | | −18 | 40 |
| Synthesis Example 11 | 98 | 166 | 257 | 334 | 0.4 | 99 | 8.2 | 59 | | −16 | 40 |
| DOP | 92 | 110 | 206 | 345 | 26.0 | — | 40.1 | — | | −22 | 40 |

What we claim is:

1. A halogen-containing resin composition comprising (1) a halogen-containing resin and (2) as a plasticizer, at least one compound of the general formula

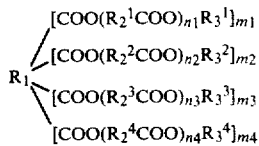

wherein $R_1$ represents an aromatic hydrocarbon group containing 1 or 2 aromatic rings or an alicyclic hydroof the general formula

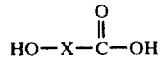

wherein X is as defined, or a polymer of any of these, and (iii) a monohydric alcohol of the general formula

Y-OH wherein Y represents a hydrocarbon group having 2 to 22 carbon atoms.

4. The composition of claim 1 comprising 100 parts by weight of the halogen-containing resin and 5 to 200 parts by weight of the plasticizer.

5. The composition of claim 3 wherein said reactant (i) is an aromatic dicarboxylic acid selected from the group consisting of phthalic acid, isophthalic acid, terephthalic acid, methylphthalic acid, naphthalenedicarboxylic acid, tetrachlorophthalic acid and tetrabromophthalic acid or an anhydride or esterified product thereof.

6. The composition of claim 3 wherein said reactant (ii) is a lactone selected from the group consisting of $\epsilon$-caprolactone, methyl-$\epsilon$-caprolactone, dimethyl-$\epsilon$-caprolactone and trimethyl-$\epsilon$-caprolactone.

7. The composition of claim 3 wherein said reactant (ii) is ricinoleic acid.

8. The composition of claim 3 wherein the monohydric alcohol (iii) is an aliphatic monovalent alcohol selected from the group consisting of butanol, hexanol, isohexanol, heptanol, isoheptanol, octanol, isooctanol, 2-ethylhexanol, decanol, isodecanol, undecanol, isoundecanol, lauryl alcohol, tridecanol, isotridecanol, tetradecanol, pentadecanol and hexadecanol.

9. The composition of claim 3 wherein the monohydric alcohol (iii) is benzyl alcohol.

10. The composition of claim 3 wherein the monohydric alcohol (iii) is tetrahydrofurfuryl alcohol.

11. The composition of claim 1 wherein the sum of $m_1$, $m_2$, $m_3$ and $m_4$ is 2.

12. The composition according to claim 2 wherein said chlorine-containing resin is selected from the group consisting of polyvinyl chloride, polyvinylidene chloride, chlorinated polyolefin, vinyl chloride/vinyl acetate copolymer and vinyl chloride/vinylidene chloride copolymer.

13. The composition of claim 1 comprising 100 parts by weight of the halogen-containing resin and 20 to 100 parts by weight of the plasticizer.

14. The composition of claim 1 wherein the plasticizer is at least one compound of the formula

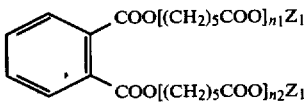

wherein $Z_1$ is a residue of 2-ethylhexanol, a residue of $C_9$ monoalcohols or a residue of $C_{11}$ monoalcohols.

15. The composition of claim 14 wherein $Z_1$ is 2-ethylhexyl and the sum of $n_1$ and $n_2$ is about 2.

16. The composition of claim 1 wherein the plasticizer is at least one compound of the formula

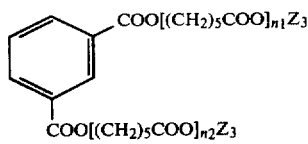

wherein $Z_3$ represents residues of $C_7$, $C_9$ and $C_{11}$ monoalcohols.

* * * * *